United States Patent [19]

Doster et al.

[11] Patent Number: 5,092,106

[45] Date of Patent: Mar. 3, 1992

[54] PROCESS FOR MORE EFFICIENT SHIPMENT OF TIRES

[76] Inventors: John Doster; Joe Barnett; Jimmy Barnett, all of Rt. 1, Box 516, Nettleton, Miss. 38858

[21] Appl. No.: 441,905

[22] Filed: Nov. 28, 1989

Related U.S. Application Data

[63] Continuation-in-part of Ser. No. 224,556, Jul. 25, 1988, Pat. No. 4,920,729, which is a continuation-in-part of Ser. No. 77,884, Jul. 27, 1987, Pat. No. 4,777,781.

[51] Int. Cl.$^5$ .................. B65B 25/24; B65B 35/50; B65B 63/02
[52] U.S. Cl. ...................... 53/436; 53/447; 53/409
[58] Field of Search .............. 53/436, 438, 447, 527, 53/529, 540, 523, 409; 414/85, 661, 907; 100/12; 206/304

[56] References Cited

U.S. PATENT DOCUMENTS

| 3,157,301 | 11/1964 | McWilliams | 414/85 |
| 3,252,737 | 5/1966 | Seaton | 53/436 X |
| 3,557,683 | 1/1971 | Boyd | 53/527 X |
| 3,908,539 | 9/1975 | O'Brien | 53/529 X |
| 4,162,603 | 7/1979 | Stromberg | 53/438 |
| 4,249,843 | 2/1981 | Kerr | 414/480 X |
| 4,559,870 | 12/1985 | Krummacher | 53/436 X |
| 4,608,808 | 9/1986 | Ryan | 53/436 |
| 4,858,415 | 8/1989 | Hake | 53/529 X |

FOREIGN PATENT DOCUMENTS

| 2345415 | 3/1975 | Fed. Rep. of Germany | 206/304 |
| 2722208 | 11/1978 | Fed. Rep. of Germany | 53/447 |

Primary Examiner—John Sipos
Attorney, Agent, or Firm—Alexander Norcross

[57] ABSTRACT

A process for increasing the shipping efficiency of an interleaved or herringbone rick of tires includes the steps of forming a herringbone rick within a container or enclosed restraint, then compressing the rick with a horizontal wedge or plate. Typical compression percentages range up past 30 percent reduction in height. The space above the compressed rick is then filled with an additional rick, or the compressed rick is banded or fastened to an underlying pallet. The compressing plate is withdrawn from the rick. The resulting compressed rick increases the efficiency of shipping tires, with no resulting damage.

1 Claim, 9 Drawing Sheets

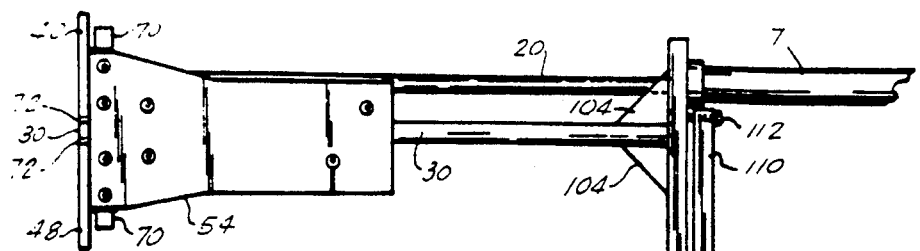
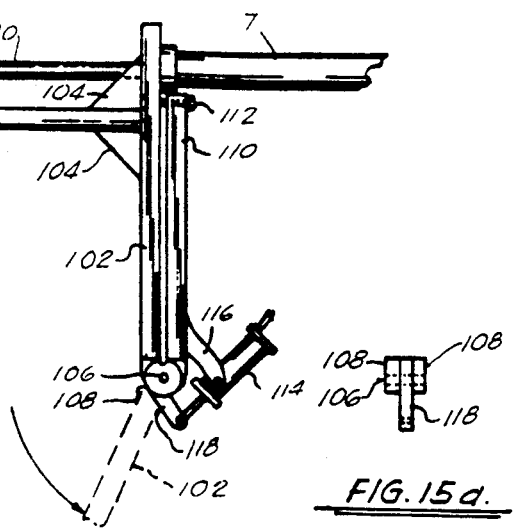
FIG. 15
FIG. 15a.
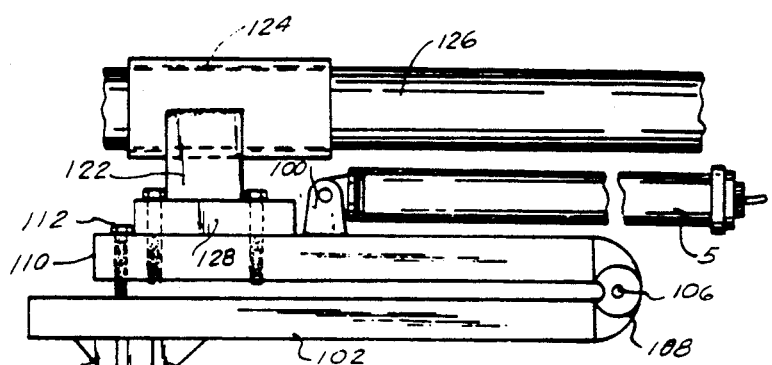
FIG. 16
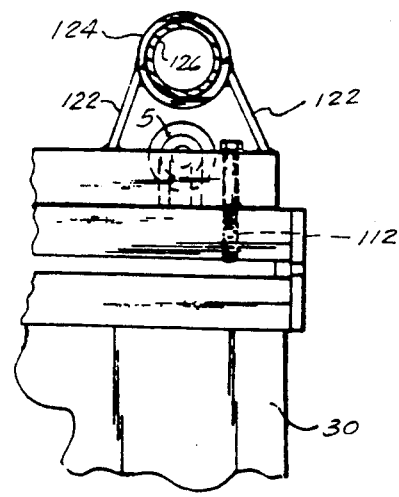
FIG. 17

PROCESS FOR MORE EFFICIENT SHIPMENT OF TIRES

This application is a continuation-in-part of our co-pending application, Ser. No. 224,556, filed July 25, 1988, now U.S. Pat. No. 4,920,724 which was a Continuation-in-part of our application, Ser. No. 077,884, filed July 27, 1987, now issued as U.S. Pat. No. 4,777,781, issued Oct. 18, 1988, which are incorporated by reference in full herein.

BACKGROUND OF THE INVENTION

This invention relates to an improved form of tire compaction apparatus, of the kind disclosed and claimed in my earlier co-pending allowed application.

The closest prior art known to the inventors for any process for unitizing or shipping tires which involves compression is a process utilizing a mechanism sold under the tradename of "Unitizer" by the Branard Division of the Sharon Steel Corporation, Charlotte, N.C. In this process, individual vertical columns or stacks of tires, that is, tires which are stacked around a single axis, are compressed approximately ten to twenty percent in height before being banded or shrink-wrapped to form unitized columnar stacks of tires for shipment.

It is believed that these particular tire packs are so treated in order to adapt the stacks to a uniform physical size for handling by automated machinery at customer plants.

SUMMARY OF THE INVENTION

This invention discloses an improved form of tire compaction apparatus in which the motor power unit, or tug, is replaced with an open frame, motorized work platform having an extremely short turning radius. The platform has an elevatable work floor, open for easy access by, and support of, one or two workmen; on one end the apparatus is provided with a tire compaction apparatus of our invention; the opposite end is provided with a raisable cargo platform for supporting either a unitized pallet of cargo for repacking or for positioning a controllable conveyor end for delivering products to be repackaged.

By providing the workman with an open, adjustable work platform, in the center of the unit, and providing him with complete and independent control over the height and location of tires and other cargo to be loaded, and over his height in relation to the stack being produced in the shipping container, all relative to the vertical position of the tire compacting wedge, we provide a significantly improved design which considerably eases the physical burden upon those workers who must actively stack the tires and operate the apparatus. This design is capable of a considerably higher throughput rate by avoiding the interposition of a tug or forklift between the workers and the work. In addition, by permitting the worker to position both themselves and the source of the tires at a convenient working height, stooping or bending is largely eliminated, and the physical strain upon the workers is considerably reduced.

In this latter aspect, this improvement to our invention is considered to have applicability of a wider range than that of tire compaction, in that it would be applicable to any circumstance in which an individual is required to remove objects from one container or platform and position or stack these objects in a second form.

Such activities are wide ranging, since no substitute has ever been found for the innate skill of a trained human being in visualizing and positioning objects in suitably complex arrays for best shipment configuration. It is widely recognized that this is still largely a heuristic problem, and one for which no satisfactory general automated substitute exists.

It is thus an object of this invention to show an improved form of tire compacting having considerably greater through put.

It is a further object of this invention to disclose a tire compactor having a much reduced physical strain on the workman positioning tires.

It is a further object of this invention to disclose a stacking apparatus which provides a significantly improved working environment for persons packing objects in a bay or a bin.

It is a further object of this invention to show an intermediate transfer apparatus having an improved human factor capability for the transfer of physical objects from a continuous flow or a first intermediate storage to a second storage configuration.

It is a further object of this invention to show a form of tire compactor which can be readily maneuvered and turned within a narrow or confined storage area such as a boxcar.

It is a further object of this invention to show a maneuverable transfer device which can be turned and maneuvered within a narrow storage location.

These and other objects of the invention may be more clearly seen from the detailed description of the preferred embodiment invention which follows.

BRIEF DESCRIPTION OF THE DRAWINGS

FIG. 1 is a side view of the invention as installed upon a typical lift truck showing the interoperative movement of the stripper bar assembly.

FIG. 2 is a front view of the invention as installed upon a standard lift truck, depicting the vertical motion of the entire apparatus for positioning.

FIG. 3 is a depiction, exaggerated for clarity, of a typical rick of tires.

FIG. 4 is a depiction of a rick of tires being compressed for loading by the apparatus of the invention.

FIG. 5 is a detailed sectional view of one corner of the stripper bar assembly, in engaging relationship with the wedge.

FIG. 6 is a section through the stripper assembly in engaging relationship with the wedge.

FIG. 7 is a vertical view downward upon the top of the apparatus in the invention as installed upon a standard lift truck after the stripper bar has been extended.

FIG. 8 is a diagram of the hydraulic controls of a preferred embodiment of the invention.

FIG. 15 and 15a are side details of the wedge pivot mechanism.

FIG. 16 is a side detail of the wedge, showing a left cylinder and support means.

FIG. 17 is a vertical section of FIG. 16.

DETAILED DESCRIPTION OF THE PREFERRED EMBODIMENT

Figure 1:
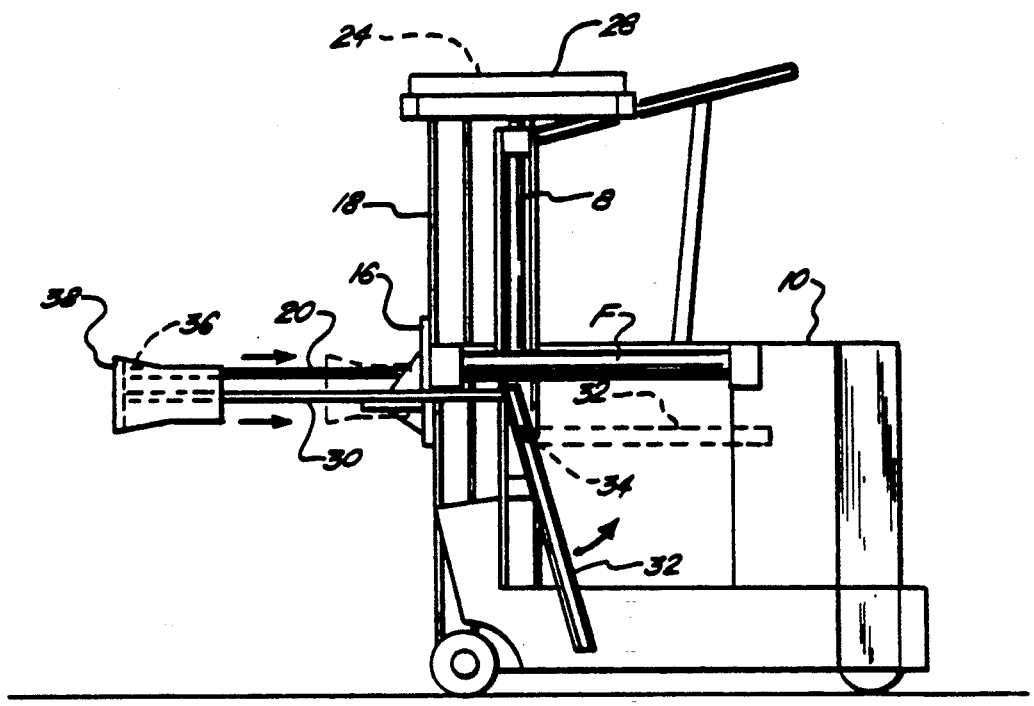
FIGS. 1 through 8 are incorporated herewith from my prior co-pending application.
Figure 2:
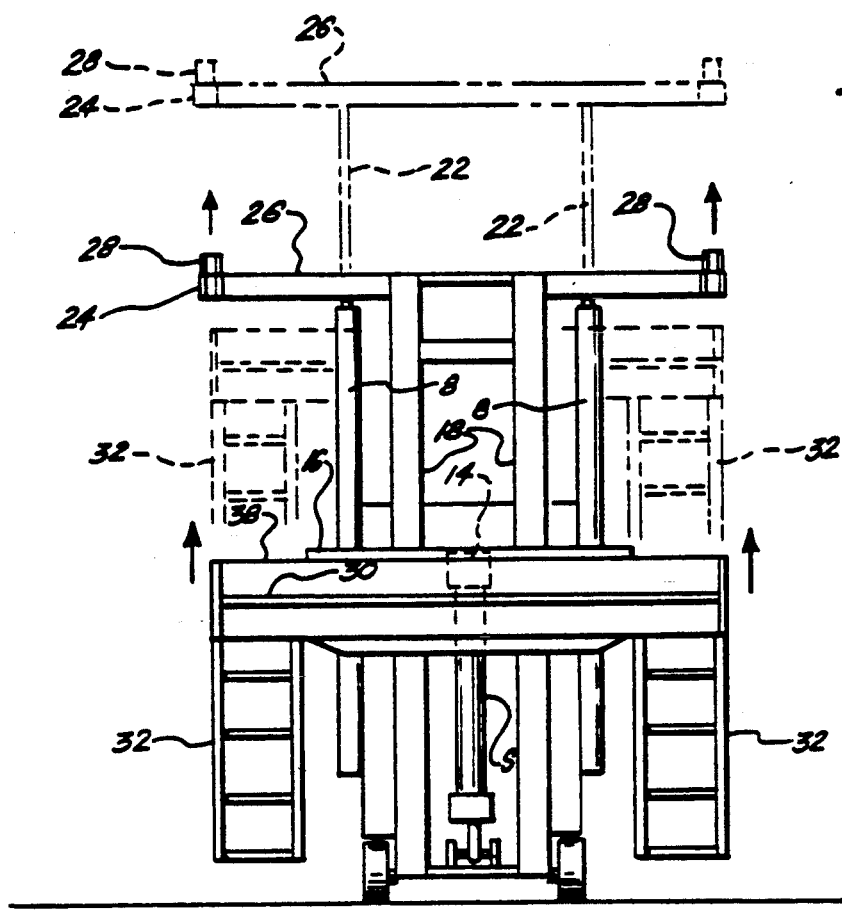

Referring to FIGS. 1 and 2, the general arrangement of the apparatus may be seen installed upon a base unit 20. One embodiment has been installed on a Tow-Motor(TM) warehouse tug although the preferred embodiment is shown in FIGS. 9-17. The vertical positioning of the apparatus of the invention is by means of a master main lift cylinder(s) 5, a double action, two stage hydraulic cylinder mounted at a lower reacting end 12 to the frame of the base unit 10. In a first test embodiment, an upper reacting end 14 of main lift cylinder 5 is fixedly connected to wedge support beam member 16. Wedge support beam member 16 is an essentially horizontal beam and plate structure, affixed for receiving vertical movement forces from cylinder upper reacting end 14 and slidably supported through interlocking sliding engagement with two parallel vertical support I-beams 18. The use of parallel vertical I-beams 18 to maintain alignment of wedge support member 16 is well understood in the art, and is common to all such vertically moving attachments for forklifts and the like; it is not further described here. The interconnecting relationship of vertical support I-beams 18, wedge support beams 16 slidably affixed thereto, and main lift cylinder(s) 5 is such as to permit wedge support 16 to support both upward or downward loads against significant twisting and overturning forces.

Fixedly engaged to wedge support beam 16 are parallel stripper bar double acting hydraulic cylinders 7, of which there are two, mounted respectively on the left and right outboard of base unit 10 and adapted to extend in a direction forward of base unit 10. Operatively extending from stripper bar hydraulic cylinder 7 are two stripper bar actuator rods 20.

On base unit 10 are fixedly mounted vertical overhead frames double acting hydraulic cylinders 8. A pair, left and right, cylinders 8 extend upward from base unit 10, and are mounted immediately outboard of vertical support I-beams 18. Each overhead frame cylinder 8 has operatively extending therefrom overhead frame actuator rod 22, adapted for two-way vertical extension, for movement of overhead frame assembly 24.

Overhead frame assembly 24 in turn consists of transverse overhead support beam 26, extending laterally, transverse to the forward direction of base unit 10, and fixedly connected to the upper ends of overhead frame actuator rods 22, in a manner which supports support beam 26 in a substantially horizontal position, as overhead frame cylinders 8 are actuated, extending or retracting actuator rods 22.

Transversely mounted on support beam 26 are crossbar members 28. In the test embodiment of the invention crossbar members 28 are made of wood, and are mounted upon sliding tubes, slidably affixed within support beam 26 so as to permit relative lateral prositioning of each of crossbar members 28 with respect to the centerline of base unit 10, and so as to permit varying the width or distance apart of the two crossbar members 28. The method of so mounting such crossbar members for telescopic sliding within an encompassing beam is well understood in the art and not shown in the drawings for clarity.

Fixedly mounted to wedge support beam member 16 and extending horizontally therefrom in a direction in front of base unit 10 is wedge 30. In both embodiments of the invention wedge 30 is a generally smooth, polished steel plate having a width substantially equal to that of a standard shipping container and a depth, or length extending in front of base unit 10 substantially equivalent to an integral multiple of tire widths of the size of tire to be compressed for shipment by the apparatus in the invention. In this test embodiment of the invention, wedge 30 is affixed to wedge support member 16 by an overlapping lip and strongly bolted thereto so as to insure an adequate strength against bending, and to maintain a horizontal position under vertical loads; in the preferred embodiment wedge 30 is mounted so as to pivot as is further described below.

In the test embodiment, extending from the left and right rear edges of wedge support beam 16, immediately outboard of base unit 10 and stripper bar cylinder 7, are folding left and right ladders 32, which are pivotally affixed at ladder upper ends 34 to wedge support beam 16 in a manner which permits ladders 32 to be lowered to a position adapted for climbing or raised to an essentially horizontal position permitting free access to the underside of wedge 30. Ladder 32 are otherwise of standard industrial construction.

Figure 5:
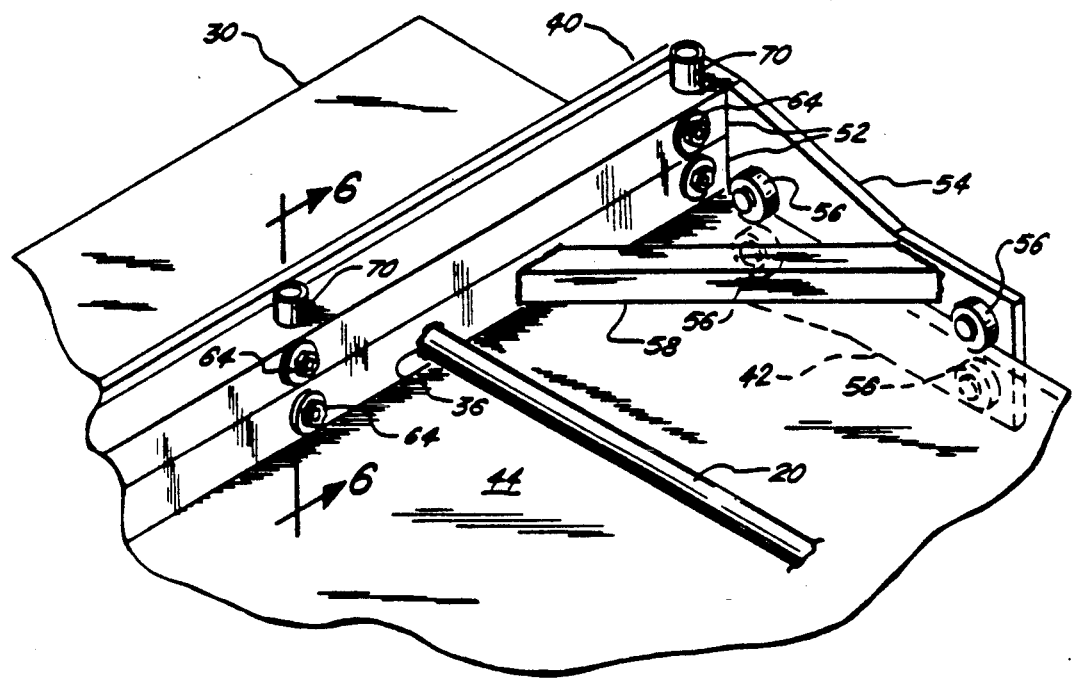
Figure 6:
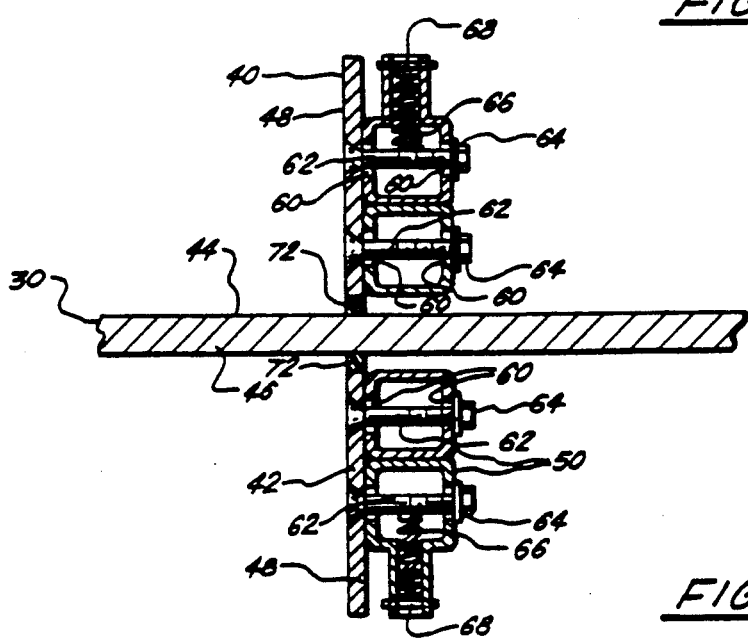
Figure 7:
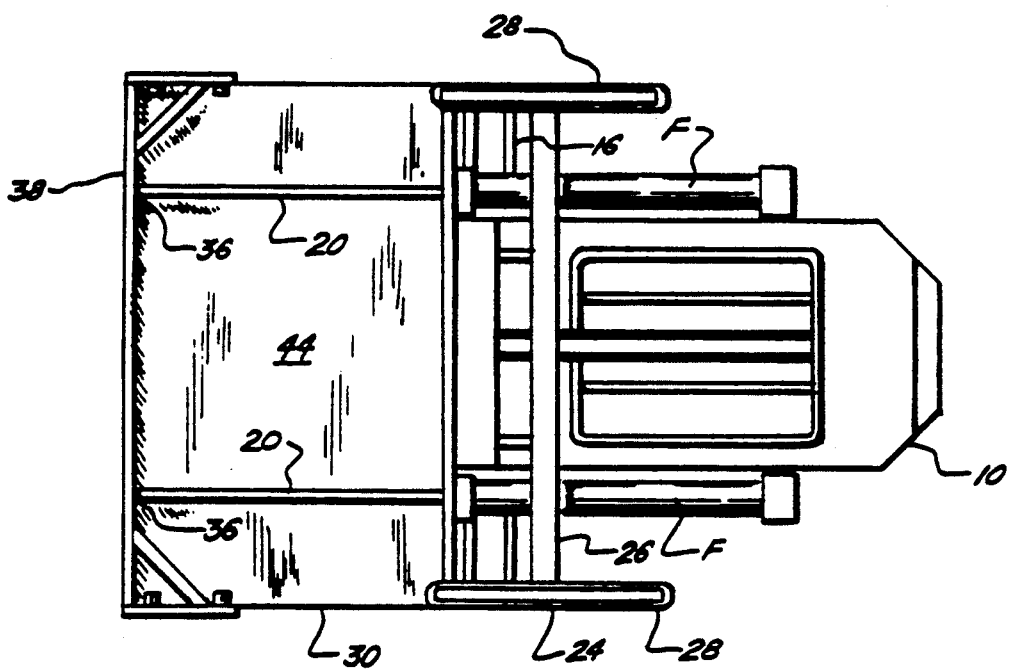
Figure 8:
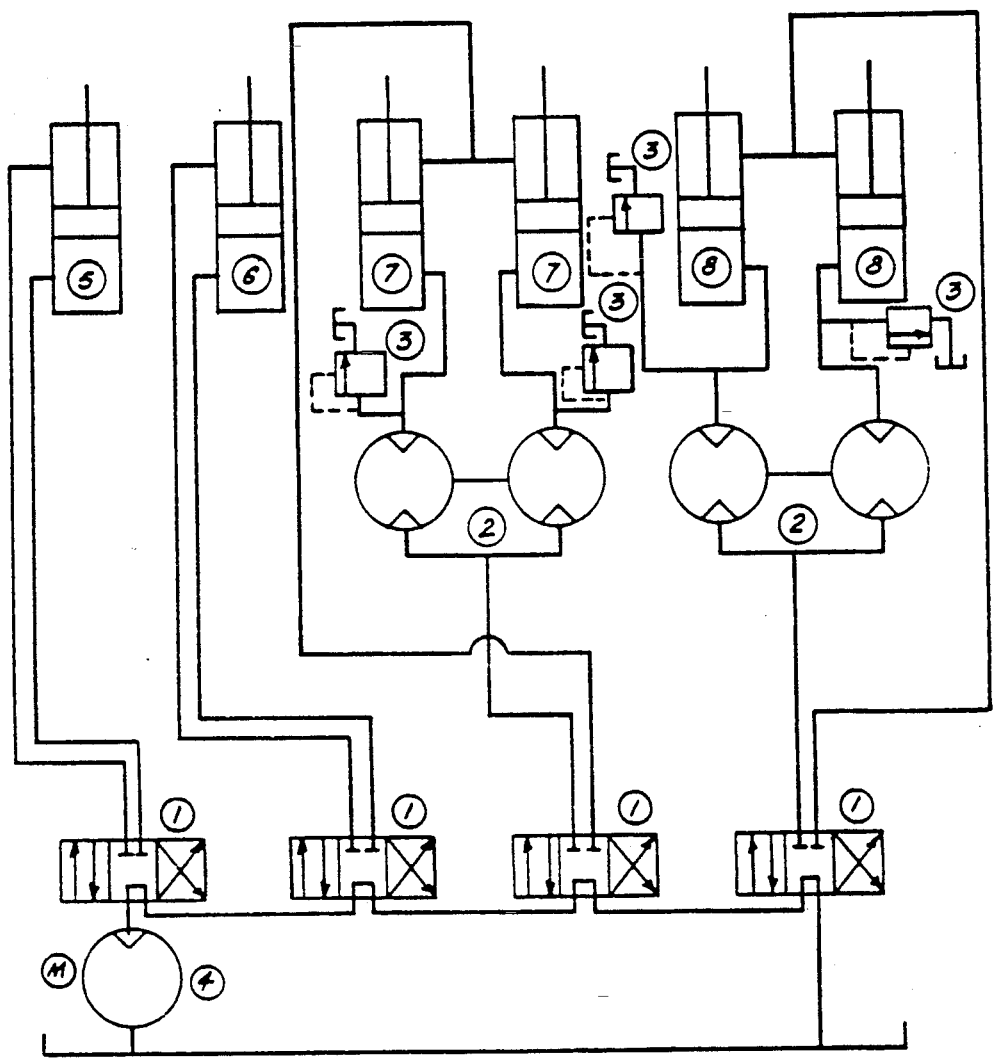

Affixed to the far, operating end 36 of stripper bar actuating rod 20 is stripper bar assembly 38. Referring to FIG. 5, and FIG. 6, stripper bar 38 is seen to comprise symmetrical upper bar member 40 and lower bar member 42, which are essentially symmetrically disposed against the upper surface 44 and lower surface 46 of wedge 30.

Taking upper bar member 40 as typical, lower bar member 42 being symmetrically constructed and oppositely disposed thereto, upper bar member 40 is seen to comprise, first, stripper push plate 48, a substantially vertically aligned flat steel plate extending horizontally beyond the width of wedge 30. Each of the upper bar 40 and lower bar 42 stripper push plates 48 are mounted to and supported by stripper bar 38, by means of parallel adjoined bar support tubes 50, which are welded together to form a substantially strong cross member extending the width of wedge 60; the upper of bar support tubes 50 are in turn operably connected to the operating end 36 of each stripper bar actuator rod 20, receiving and transmitting the entire force thereof.

In turn, bar support tubes 50 for upper bar members 40 and bar support members 50' for lower bar member 42 are interconnected, to form a single, solid, strong member, at bar support ends 52, by being welded to stripper bar end support plate 54. Although one plate 54 is shown, it is understood that two plates 54 are provided, one at each end of bar support tubes, 50, 50'. Bar support plate 54 is an essentially elongate plate extending vertically both above and below wedge 30 and provided with adjoining wedge rollers 56 to maintain bar support tubes 50, 50' in straight alignment with wedge 30. A corner brace 58 is provided extending and welded between an area near one end of support plate 54 and an area near bar support end 52 to strengthen the attachment of support plate 54 and bar support tubes 50, 50'.

Referring to FIG. 6 it will be seen that each of bar supports 50, 50' are provided with vertical sleeve openings 60 within which push plate support bolts 62. Each of push plate support bolts 62 are countersunk and affixed by welding to push plate 48; bolts 62 are secured within bar supports 50 by means of matching nuts and washers 64. In practice nuts 64 are tightened to within a one-half turn of full tightness, permitting lateral vertical movement of bolts 62, and thus push plate 48, with respect to bar supports 50. Within bar supports 50, each pair of push plate support bolts 62 are mounted against bias springs 66, secured in a compressed position by spring-lock members 68. Each of springs 66 are compressed to provide a substantially strong biasing force, which reacting between bolts 62 and bar supports 50, 50' clamps plates 48 against upper surface 44 and lower surface 46 of wedge 30. In order to support springs 66 in a columnar form under this compression, springs 66 extend for a distance within spring support cylinders 70, mounted in and extending outwardly from bar supports 50.

Fixedly mounted on an edge of stripper push plate 48, on the edge contacting the surfaces of wedge 30, are oil impregnated brass bearing strips 72; strips 72 are affixed to the edges of plate 48 by screws or by any other suitable method, and provide a wiping bearing surface between stripper bar plates 48 and wedge 30.

Figure 3:
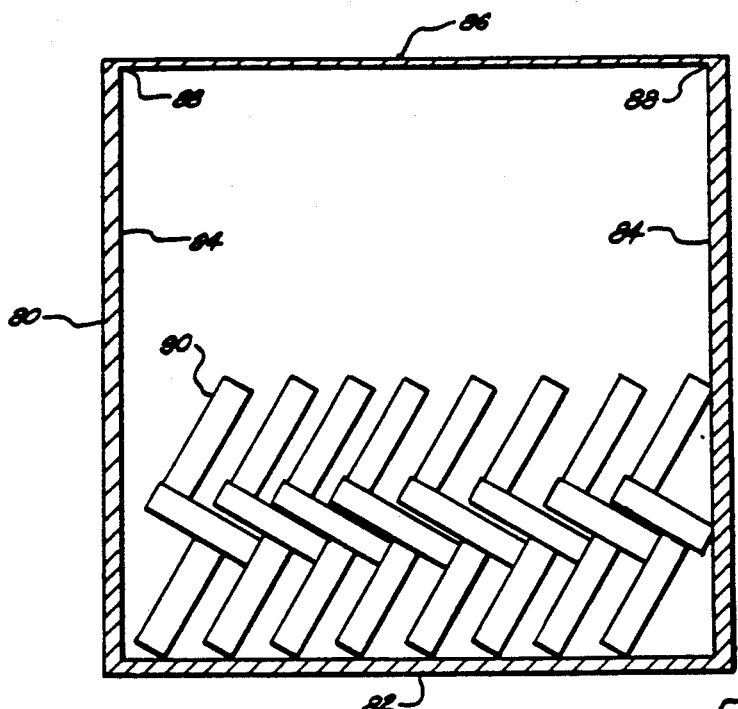
Figure 4:
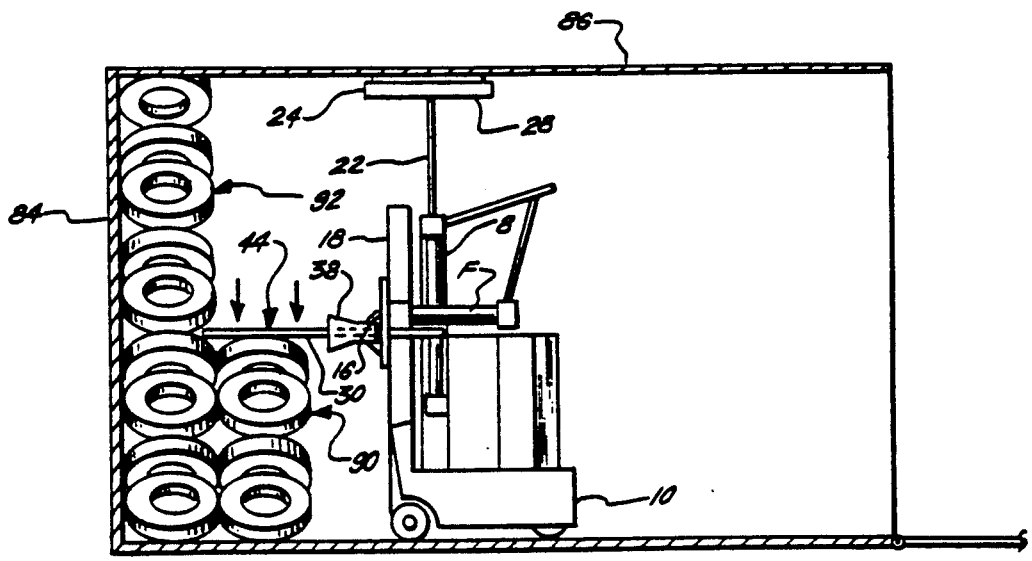

In use the invention is used in conjunction with the standard stacking and shipment of tires within a container. FIG. 3 and FIG. 4 show a typical shipping container 80 containing therein alternating rick of tires 90. Tire rick 90 is created by stacking alternating layers of tires at angles with respect to each other so that the tires essentially interlock, the outer rim of one layer of tires tending to fall to within the central hole of that layer of tires immediately beneath, the central hole of a layer of tires tending to engage the outer rims of the layers of tires immediately beneath, the pattern repeating in a herringbone effect. The distance and angle between tires in FIG. 3 is exaggerated to show this herringbone effect. In practice, the individual tires would be closely abutted one to another with no substantial intervening space and the tires would be canted about 15 degrees to horizontal; a more vertical or greater angle would induce bead damage. This method of stacking tires has proven in practice to be the most satisfactory and provides the highest density stacking achievable within a fixed container.

Container 80 in turn, whether it be a standard internodal container or a standard truck trailer, is an essentially rectangular box having a base 82, substantially strong side walls 84 and a roof member 86. The base 82 provides not only the load carrying capacity for the contents of the trailer, but is also the principal support and structural member for the container 80 itself, and is quite strong; for similar reasons the side walls 84 are usually of a strength equivalent to that of base 82. In internodal containers, the vertical bearing loads of stacking containers one upon the other is transmitted through the side walls and they are reinforced for this purpose. The roof 86, however, is essentially a weather protecting surface and, save for providing adequate strength to avoid tin canning, and in an intermodal container some resistance to breaching as intermodal containers are stacked, is generally of a weaker construction than side walls 84. However, the lines along which roof 86 and side walls 84 join at corners 88 are substantially strong for the entire length of the container.

In use, therefore, the invention, mounted on base unit 10 is inserted within a container against a back wall 89 or already installed rick 92.

Overhead frame cylinders 8 are then actuated, to raise overhead frame 24 to within contacting relationship with container roof 86. Crossbar members 28, which act as outriggers in this case, are then extended so that each of crossbar members 28 will fit contactingly within corners 88 of the roof. Pressure is then placed upon overhead frame cylinders 8 to lock overhead frame 24 in position.

Main lift cylinder 5 is then actuated utilizing control 1, raising wedge 30 to within contacting distance of the roof. A standard interleaved herringbone rick of tires 90 is then manually installed underneath wedge 30, filling the vertical space from floor 82 to adjacent roof 86, contacting the underside of wedge 30.

Personnel are then withdrawn and lift cylinder 5 is actuated in a counter-direction using control 1, lowering wedge 30, compressing rick 90 of tires. The reaction force of this compression is transmitted through wedge support member 16 and lift cylinder 5 to the frame of base unit 10 and thence through overhead frame cylinder 8, and actuator 22 to overhead frame 24 and thence into roof 86, or as required by the strength of the container, the corners 88.

In practice it is found that wedge 30 may be successfully lowered so as to compress rick 90 from up a third to half of its typical height without causing excessive stresses upon container 80, and without imposing damaging deformation or creating a permanent set in the tires within rick 90. Typical results, achieved in tests is given below.

At this point, a second smaller rick 90 is manually installed upon the upper surface of wedge 30 treating it as though it were the floor 82 of a smaller container. This rick, as should be apparent to those skilled in the art, will contain proportionately as many tires as original rick 90 is compressed.

After the second, smaller rick is installed upon the upper surface of wedge 30, overhead cylinders 8 are released, lowering frame 28. The brakes of base unit 10 are released and stripper bar cylinders 7 are activated in coordination, forcing stripper bar 38 against tire rick 90, forcing base unit 10 backward, withdrawing wedge 30 from within the fully installed rick of tires, while maintaining pressure through push plates 48 against the rick of tires. The wiping action of the oil brass bushing plates 72, compressed against upper surface 44 and lower surface 46 of wedge 30 by the force of the bias springs 66, prevents the extrusion or pulling of tires or tire material along wedge 30, as wedge 30 and base unit 10 mutually withdraw.

When wedge 30 is fully withdrawn, stripper bar 38 is then retracted and the process repeated.

Power to the parallel hydraulic cylinders is by fluid through unitized hydraulic control 1 and is divided by hydraulic flow dividers 2 to insure that the actuation of stripper bar 38 by parallel stripper bar cylinders 7, and the vertical pressures by overhead frame cylinders 8 are balanced, preventing canting and jamming either of the stripper bar 38 upon wedge 30 or of the base unit 10 within container 80 during compression of the rick. Likewise, hydraulic fuses 3 of standard design are installed within the hydraulic fluid lines to stripper bar cylinders 7 and overhead frame cylinders 8 so as to prevent a dangerous hydraulic pressure overload condition should too much compression be imposed or should there be excessive jamming. Should wedge 30 become jammed within a rick, it is found that a slight raising and lowering of wedge 30 through cylic activation of lift cylinder 5 is usually sufficient to free it enough to permit it to be withdrawn through stripper bar 38.

It is found in practice that the interlocking of various tires within a compressed rick produced by the apparatus of the invention is such that the tires do not rebound to a uniform pressure throughout but that the upper row of tires, adjacent roof 86, remains substantially loose and easily removable. Thus, a load of tires installed by the apparatus of the invention still may be unpacked by typical manual means.

In the course of testing our invention as described and claimed in our co-parent application, we have discovered the following improvements in the mechanism, and in addition have discovered that we have achieved a new and novel process for preparing tires for shipment which greatly exceeds the one prior art that is known to us, described in the background of the invention above.

Our improved mechanism, as shown in FIGS. 9-17, must be read in reference with FIGS. 1-8, incorporated herein by reference.

Figure 9:
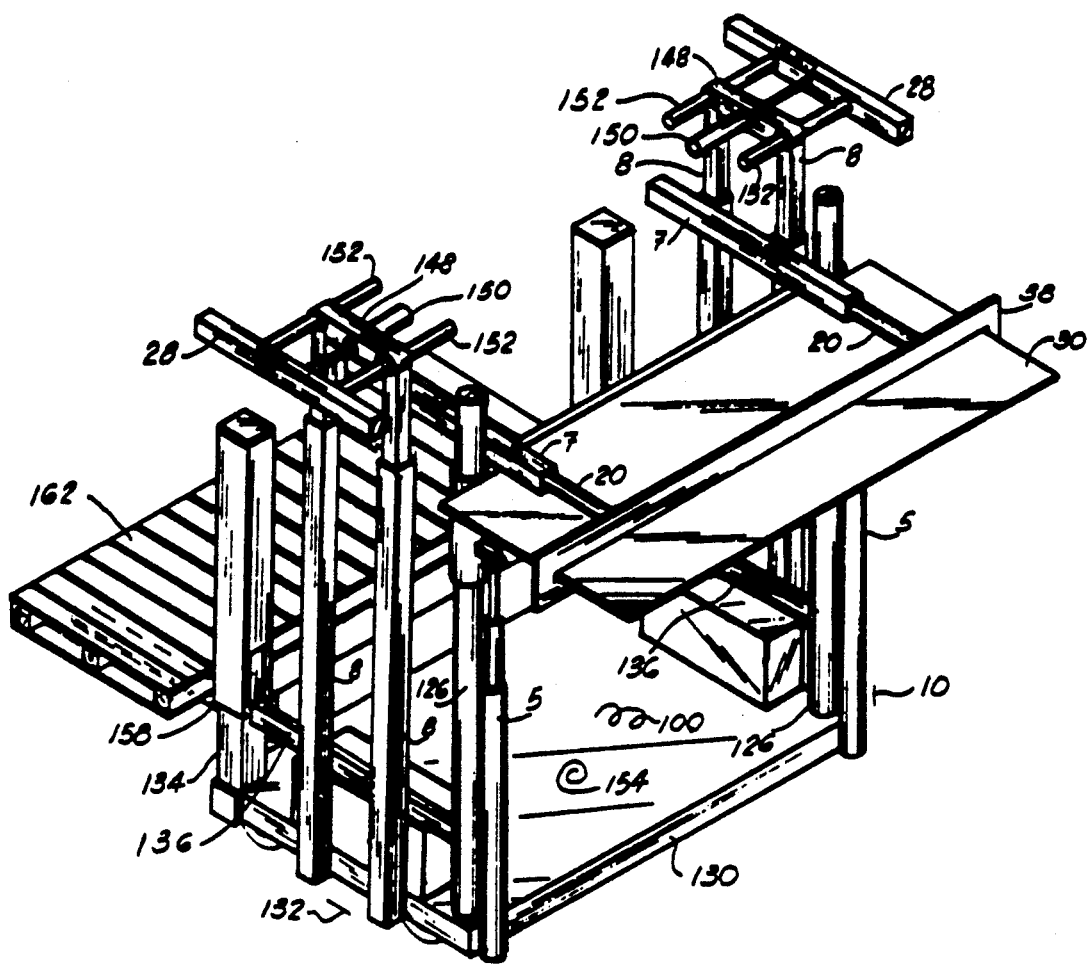
FIG. 9 is an angled view of the invention showing the relative positioning of wedge, work platform and cargo platform.
Figure 10:
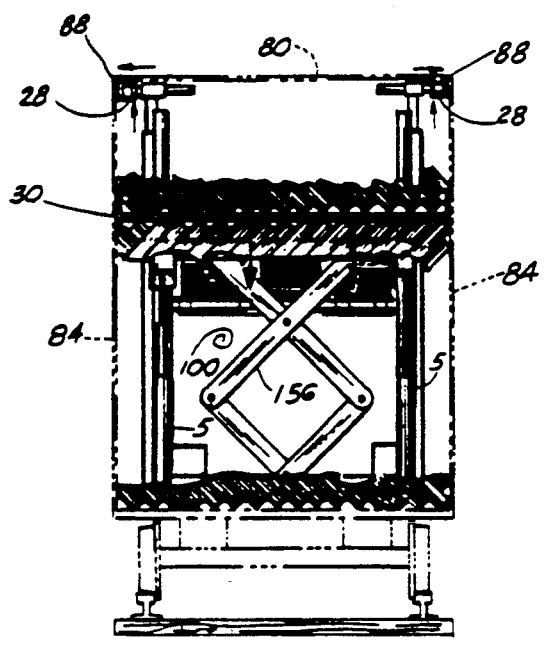
FIG. 10 is an end view of the invention showing activation of the work platform scissor's lifts.

Refer principally to FIG. 9 in which we show a simplified figurative version of our stripper bar 38 on our compression wedge 30. We have discovered that a better function may be obtained by providing two parallel main lift cylinders 5 to which the compression wedge 30 is attached. This split vertical system of main lift cylinders 5 permits the creation of an open workspace area 100 between the two open lift cylinders 5, both above and below compression wedge 30.

Figure 11:
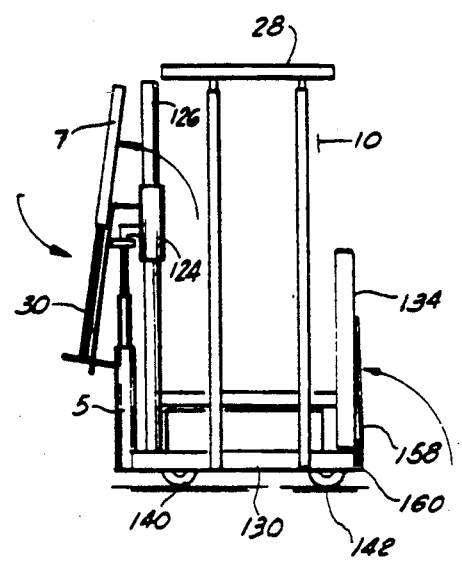
FIG. 11 is a side view of the invention showing the compression wedge and cargo platform being folded for optimum turning radius.
Figure 12:
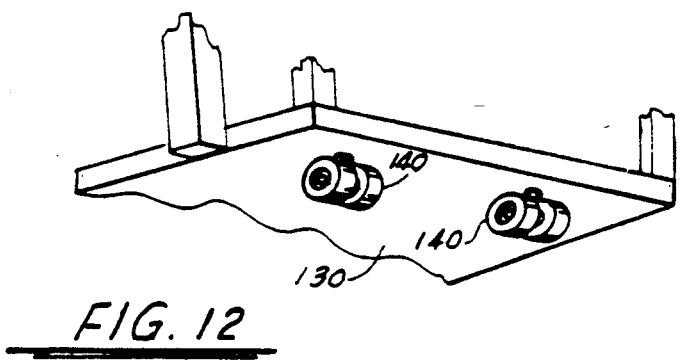
FIG. 12 is a bottom view of the invention showing two hydrostatic drive wheel structures.
Figure 13:
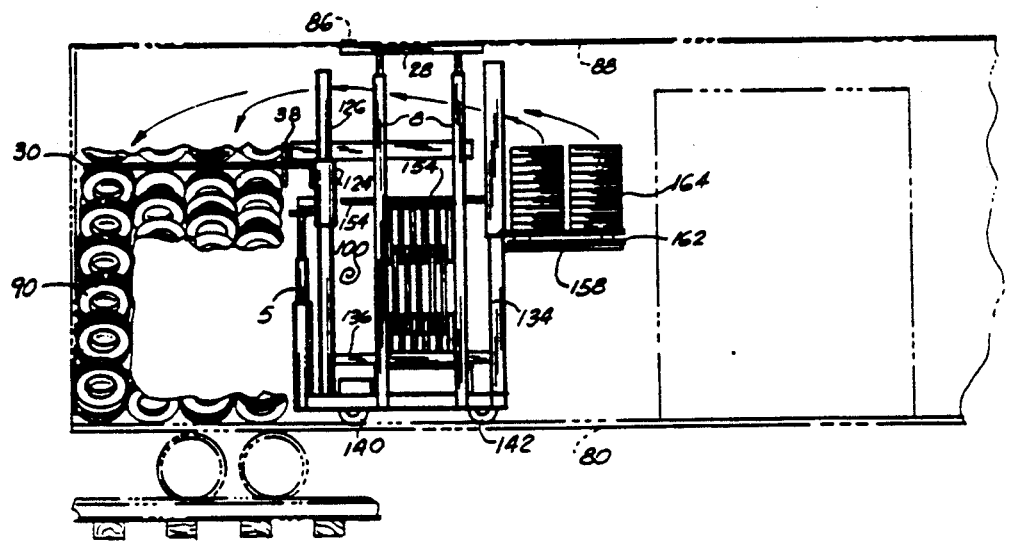
FIG. 13 is a side view of the invention in a first position in use within a confined structure.
Figure 14:
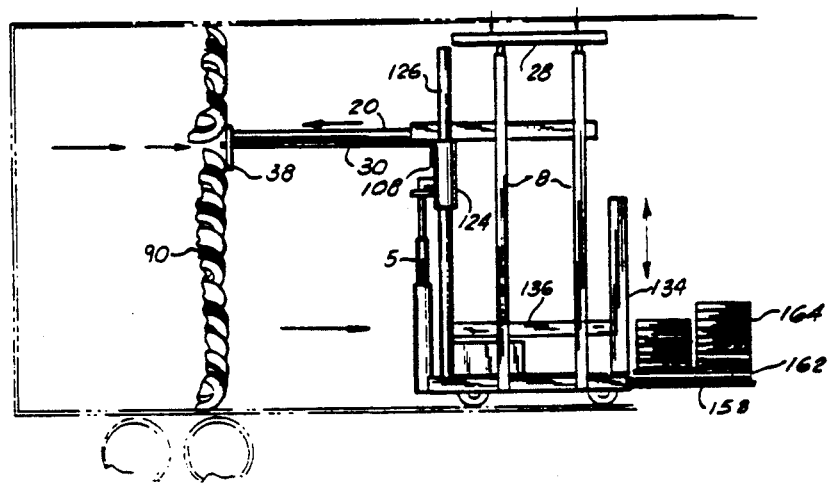
FIG. 14 is a second view of the invention in use within a confined structure.

As shown in FIG. 11, and detailed in FIGS. 15-17, we then provide a mechanism for tilting the wedge 30 into a substantially vertical position, significantly reducing the overall length of the mechanism as installed in main 10. Referring to FIG. 15, wedge 30 is now fixably attached and perpendicular to wedge support plate 102. This attachment is strengthened against compressive loads by wedge support gussets 104, angled reinforcing gusset plates welded between wedge 30 and support plate 102.

Wedge support plate 102 is pivoted about hinge axis 106; there are in the preferred embodiment four wedge hinges 108 along axis 106.

Hinges 108 interconnect support plate 102 with vertical positioning plate 110. At a lower end of positioning plate 110, wedge support plate 102 is pivoted about the wedge hinges 108 as stated; at an upper end of positioning plate 110 are periodically spaced wedge levelling screws or wedge levelling means 112, in the preferred embodiment an adjusting screw for establishing a fixed horizontal position of wedge 30.

About two of hinges 108, torque is applied to wedge support plate 102 to pivot wedge 30 from a horizontal to a substantially vertical position by means of wedge tilt actuators 114. These are small hydraulic actuators, for example, Sheffer brand trunnion front-mount hydraulic cylinders style TF. These two wedge tilt actuators 114 are offset mounted from the vertical positioning plate 110 on tilt cylinder trunnion mounts 116; the tilt actuators 114 position wedge 30 by tilting wedge support plate 102 around hinges 108 through wedge tilt lever arm 118.

Two such wedge tilt actuators 114 are provided around two of the hinges 108.

Adjacent the other two hinges 108 is a vertical support mechanism through which main lift cylinder 5 is interconnected to wedge 30.

Main lift cylinder 5 is now divided into two such cylinders, mounted in an inverted configuration; each cylinder is a double acting two-stage hydraulic cylinder, top mounted to base 130 and bottom mounted through lift cylinder clevis mount 120 to positioning plate 110. In order to maintain positioning plate 110 in a substantially vertical position against the reactive forces on wedge 30 and the lifting or compressing forces exerted by lift cylinder 5, plate 110 is coupled through a support mount 122 and sliding support bushing 124 to vertical support pipes 126; support bushing 124 vertically slides along positioning support pipe 126, a substantially strong vertically extending pipe which resists twisting forces imposed by actuation of wedge 30.

Support mount 22 is a welded split flange mount interconnecting bushing 124 with base 128; base 128 is affixed to vertical positioning plate 110 in the preferred embodiment by bolts, for example, two inch grade nine bolts.

Support bushing 124 is preferably an elongated bronze sleeve bearing of between twelve and eighteen inches in length and of suitable diameter to closely slide along positioning pipe 124 which is, for example, eight inch diameter vertical tubing. The resulting structure provides considerable resistance to twisting, maintains vertical positioning plate 110 in a substantially vertical position under the combined forces imposed against wedge 30 and imposed by lift cylinder 5.

Main unit 10 of the invention now comprises a main support base platform 130 upon which are erected sidewall frame structures 132 along both a left and a right sidewall. Sidewall frame structures 132 comprise positioning support pipe 126, overhead frame cylinders 8 and rear platform positioning cylinder 134.

A substantially strong horizontal brace member 136, acting in conjunction with the innate strength of main support base 130 provide stiffening and reinforcement against bending for these vertically ascending structures. Beneath but adjacent to horizontal support 136 is electrohydraulic power box 138; in the preferred embodiment this box contains both electric storage batteries, as well as the hydraulic drive mechanism, substantially along the lines of hydraulic controls shown in our co-pending patent. Electrically driven hydraulic pumps, supplied from a 24 udc storage battery provide the main hydraulic power for activating all cylinders within the apparatus, eliminating the need for internal combustion engine and degeneration of exhaust fumes within confined storage spaces.

The design of such a electro-hydraulic system is considered within the knowledge of the art, and is not a material part of this invention and therefore is not described further. Any suitable system generating 600 to 1000 psi is adequate for the purpose; similar systems are in widespread use in warehouse tugs.

Platform base 130 is supported upon three independent pivoting wheel structures 140. Two such wheel structures 140 are independently powered double wheel hydrostatically driven wheels; the third wheel structure 142 is a freely pivoting double wheel structure. The three wheel structures 140, 142 are positioned in a triangular position with the two hydrostatically driven wheels 140 in the left and right front corners and the third non-driven wheel structure 142 centered in the rear center of base 130.

In distinction to the structure shown in our prior patent, we have split the outriggers or cross bar members 28 from overhead frame 24; each of crossbar members 28 is now independently supported through overhead frame member 146, a transverse fore and aft beam interconnecting the tops of the twin overhead frame cylinders 8. Outrigger 28 is slidingly supported for extension laterally from transverse frame 148 by twin outrigger support bars 152, sliding bars journaled to permit lateral sliding motion of outrigger 128 but of a strength to support outrigger 128 against substantial vertical or rotating forces.

Outrigger 128 is extended or retracted with respect to transverse frame 128 by means of outrigger extension activator 150, a relatively small double acting hydraulic cylinder for fine positioning of outriggers 28.

By splitting vertical lift cylinders 5 into a left and right side unit and by building the structure of the apparatus 10 substantially as two symmetrical sidewall frames 132, a center open work area 100 is created above main support base 130.

This work area 100 is defined at its bottom by platform floor 154, a vertically nsible floor member installed in and arising from base 130. Platform floor 154 is supported and erected by means of scissors jacks 156, a hydraulically actuating scissor jack having preferably an 8" minimum height and an 48" maximum extension, providing thereby 40" of vertical positioning for the work platform floor 154.

Similarly, the two rear platform positioning cylinders 134 each individually activate platform forks 158. Platform forks 158 are in design identical to a standard forklift fork, and are pivoted on hinges 160, permitting the forks 158 to be folded up against rear platform positioning cylinders 134. Each of platform forks 158, when extended, are spaced so as to support a standard pallet 162 or similar load carrying apparatus for carrying a load, in the case of the example here given, tires 164. As an alternative for those situations in which a continuous flow of materials on a conveyor is provided, platform forks 158 may be provided with an adaptor for positioning vertically a conveyor belt end (not shown), and the conveyor belt in turn would provide, vertically positioned by platform forks 158, a flow of load materials 164.

Both the platform forks 158, as activated by hydraulic cylinders, and floor 154, as activated by scissors jack 156, are considered to be well within the art of hydraulic positioning equipment and are directly adapted from structures and widespread use for forklifts and for vertically positioned work platforms. Their individual design is considered well within the level of competence of one skilled in the art of such structures.

The hydraulic controls for the various hydraulic actuators within the apparatus 10, as earlier stated, are preferably electro-hydraulic, driven from twenty-four volt storage battery main power sources. A general hydraulic supply, preferably 600–700 psi, but rising to as much as 1000 psi, has been found adequate for all positioning including vertical compression of wedge 30 against resistance. Independent, individual controls are provided for: vertical main lift cylinders 5; each pair of overhead frame cylinders 8; outrigger extension actuators 150; each of the two driven hydrostatic-driven wheels 140 and rear platform positioning cylinders 134. Where pairs of cylinders must be activated to move a structure, notably left and right overhead frame cylinders 8; main lift cylinders 5; and rear platform positioning cylinders 134, they are driven from a single control through a flow divider which assures that equal and identical extension or retraction of the cylinders occurs maintaining even, parallel forces on the activated structures.

For purposes of safety, in the preferred embodiment separated control positions are provided within the work area 100 on platform floor 154, physically separating the controls for activating vertical lift cylinder 5; the controls for activating platform floor 154, and the controls for activating rear platform lift 134. The purpose of this separation is to ensure that an operator cannot accidently activate one of the other two major moving structures while attempting to control the position of a third; it is felt that this is desirable inasmuch as the operator would be riding on platform 154, one of the activated platforms, and he should not be subjected to the inadvertent movement of a portion of the apparatus which he is not concentrating on.

It is felt that the inventive apparatus 10 as disclosed is a significant improvement over the prime mover of the prior art in that it provides an open centralized work area for a workman to remove pallet load or cargo 164 from a provided pallet 162 or a conveyor end and in turn position it with respect to a desired rick 90. By individual manipulation of the relative heights of pallet 162 and work platform floor 154, the operator can ensure that minimum bending is required and that both the rick 90, the operator, and the source of load 164 are at optimum desirable heights for rapid and speedy movement and stacking of whatever cargo, whether tires or some other form, is desired.

By providing that both the wedge 30 and the rear platform forks 158 may be folded in against the structure main unit 10, the overall exterior dimensions of main unit 10 may be reduced to essentially a square shape. By then providing a triangular wheel base structure as above described, two of the wheels being independently hydrostatically driven and the third wheel being freely pivoting, it is possible to rotate main unit 10 and thus the whole apparatus in its own diameter. As a result, it becomes possible to manipulate and turn the apparatus within a confined space as may be found within a box car having only a side entrance door, and yet overall have a wedge 30 sufficiently wide to compress a rick 90 from side to side within the confines of the box car. This is considered to provide a considerable maneuverability improvement in working in confined containers 80 over the prior embodiment and over the prior art forklifts or material handling apparatus, most of which are of such restricted maneuverability as to make working in a side load container extremely difficult.

Further usage of the apparatus of the invention has disclosed that the process of compressing an interleaved rick of tires appears completely novel with respect to the art. As stated above, the only known compression of tires for shipment is the process obtaining approximately a ten percent reduction in stack height on a vertical cylindrical stack of tires.

Tests to date have indicated that the following stackings can be obtained upon interleaved ricks of tires at the shown working hydraulic pressures without detectable damage to the tires.

| Hydraulic Pressure | Tire Type | Compression |
| --- | --- | --- |
| 500 psi | P205/60R-15 | 26% |

-continued

| Hydraulic Pressure | Tire Type | Compression |
|---|---|---|
| 500 psi | P225/70R-15 | 30% |
| 500 psi | P205/60R-14 | 31% |
| 600 psi | P205/60R-14 | 46.1% |
| 500 psi | C78-14 Bias | 47% |
| 500 psi | P215/75R-15 | 30% |
| 500 psi | P205/75R-15 | 30% |
| 1000 psi | Various Radials | 52% |

The above stated pressures are all with vertical main lift cylinder 5 having an effective working area of 4.12 square inches; thus at 500 psi a hydraulic force of 2,060 lbs. is generated. In the test embodiment of the invention, the static deadweight load of the wedge and associated mechanism is 920 lbs. and thus 2,960 lbs. of compressive force is applied to the tires. At 600 psi, 2,972 lbs. of compressive force is applied to the tires. Although tests have been run as high as 1000 psi without causing damage to certain tires it is now considered that 600-700 psi is the preferred hydraulic pressure range for applying downward force to tires. The above test data indicates that significantly increased compressive effect can be achieved over anything apparently believed possible in the prior art, without damage to interleaved ricks of tires. Thus it is considered that the process of compressing an interleave rick of tires to increase its storage density is itself inventive.

It is now apparent that the increased efficiency attaiable in the compression of Herringbone or interleaved tire ricks extends beyond the enclosed container or boxcar above described. Once the rick has been compressed, it may be moved or shipped as an entity, so long as it is banded. The relatively slow rebound time observed, in that some time is required for a compressed rick to expand to normal size, apparently due to internal friction, permits banding or other restraint to be applied to the compressed rick.

The tires must be compressed within a restraining container; that is, the sides and back of the rick must be confined during compression. The rick may, for example, be built upon a pallet placed within a container or a side and back wall restraint. The rick is compressed as above described; however, instead of assembling a second rick on the top of the compressed rick, the compressed rick is banded, and the wedge then removed.

In another alternative, tires are sometimes shipped within a wire mesh container, approximately the same foot print as a standard shipping pallet, but having an enclosing top. The efficiency of such shipment may be improved by forming a herringbone rick within such a container, compressing the rick to the height of the container, and enclosing the rick within the container. The slow rebound time of the ricks of the process may aid in this step, by permitting a slight raising of the wedge to pass the enclosing top members across the compressed rick.

Clearly, the resulting independently compressed ricks of the process will provide an even greater volumetric efficiency in shipping, as all of the tires will be under maximum compression.

Thus the invention is restricted not to the specific embodiment shown in our prior or in the present application but to that wide range of equivalents which are encompassed within the claims.

I claim:
1. A process for increasing the efficiency of shipment of tires comprising:
   a. forming, within a closed top shipping container a vertical, standing, interleaved rick of tires;
   b. compressing, with means for applying a uniform, downward force on an upper face of said rick, said rick of tires to a substantially lower height;
   c. holding, with said means, said rick of tires at said lower height;
   d. creating a second, interleaved rick of tires above said means to fill the remaining vertical space within said container;
   e. withdrawing said means from between said first and said second rick;
   f. securing said rick at said lower height by said second interleaved rick.

* * * * *